Feb. 23, 1954  H. C. STIEGLITZ  2,669,911
INDEX CORRECTOR

Filed Aug. 21, 1951  3 Sheets-Sheet 1

Inventor
Henry C. Stieglitz

Feb. 23, 1954   H. C. STIEGLITZ   2,669,911
INDEX CORRECTOR
Filed Aug. 21, 1951   3 Sheets-Sheet 2
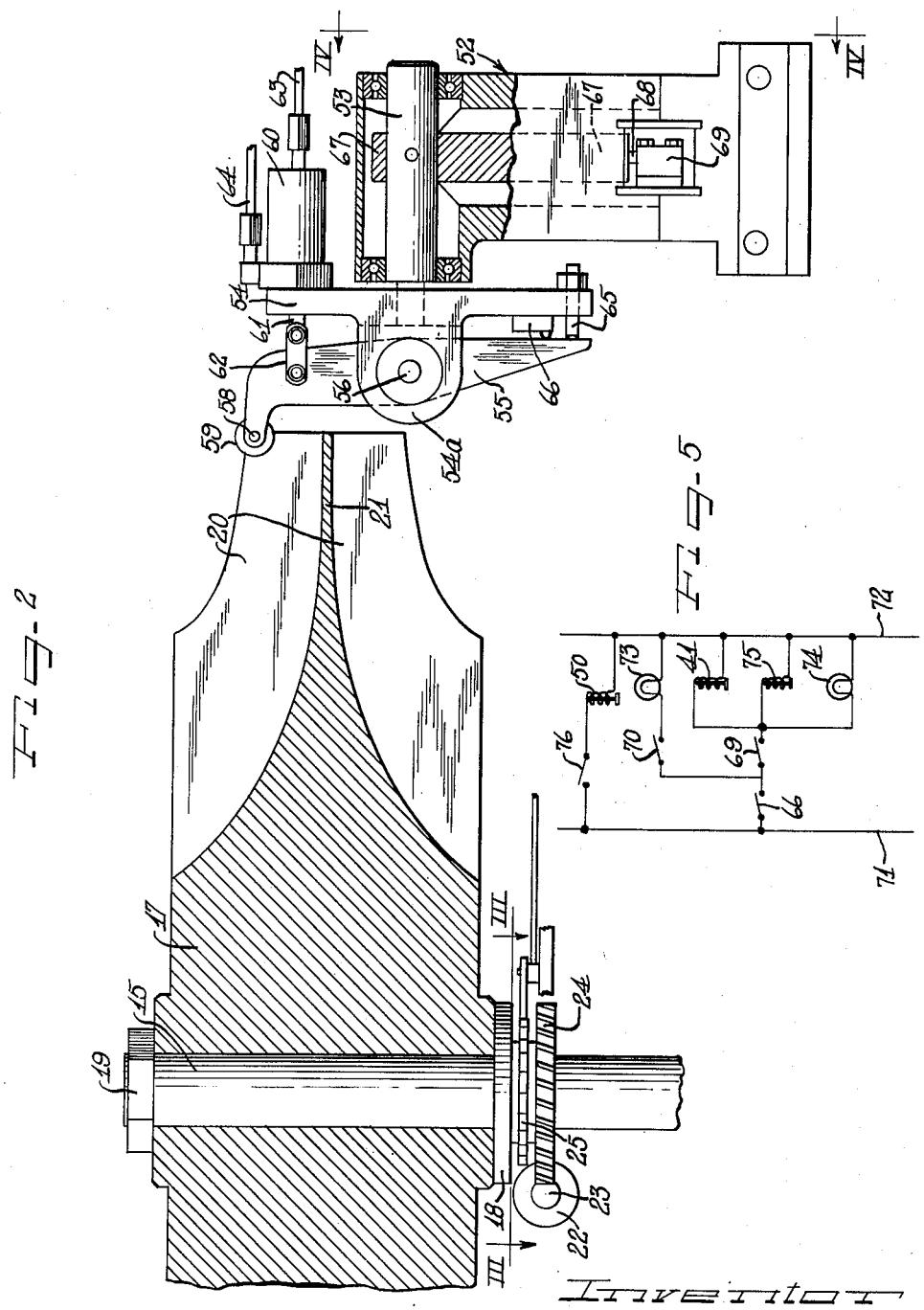
Inventor
Henry C. Stieglitz

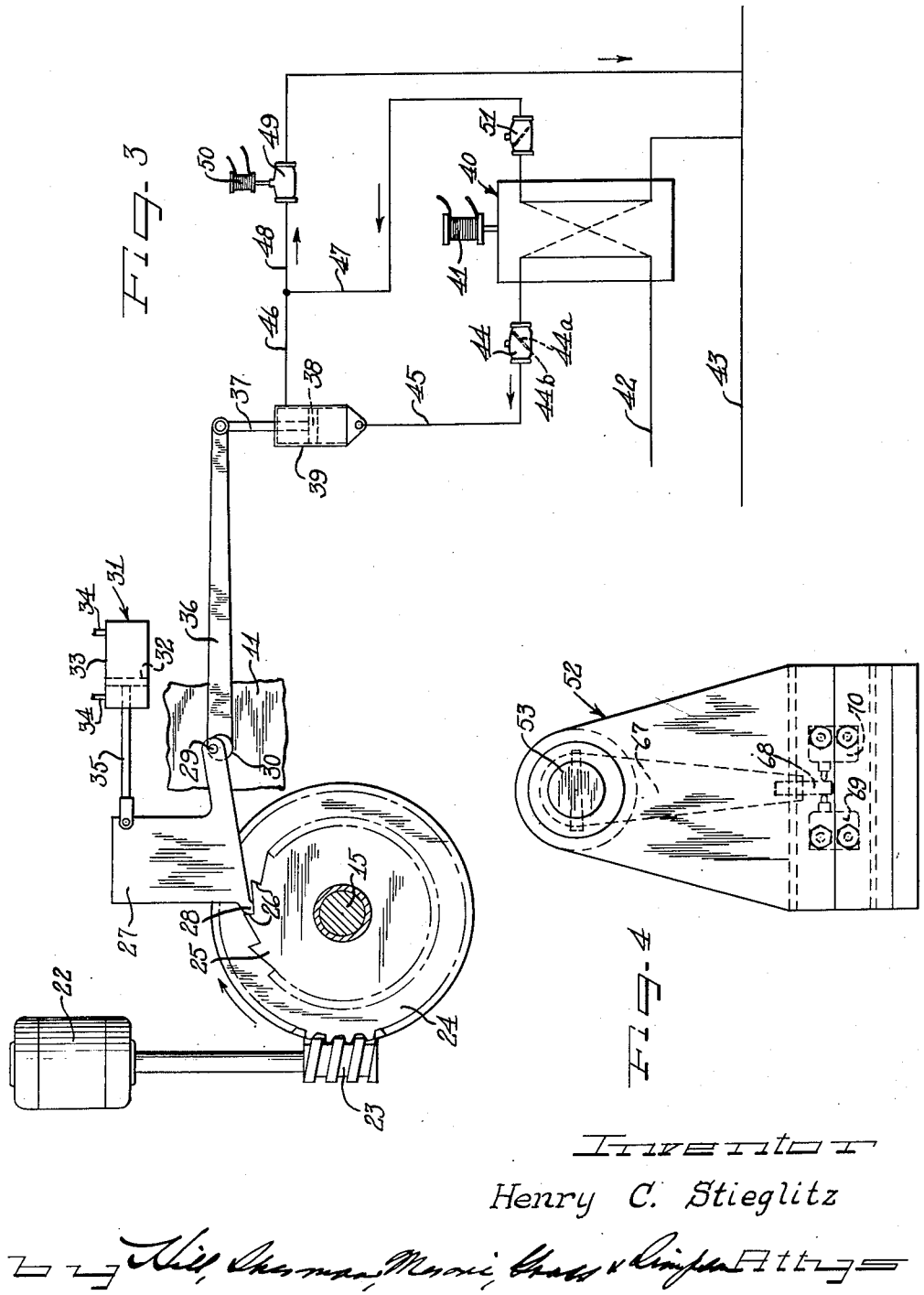

Patented Feb. 23, 1954

2,669,911

UNITED STATES PATENT OFFICE 2,669,911

INDEX CORRECTOR

Henry C. Stieglitz, Cleveland, Ohio, assignor to Thompson Products, Inc., Cleveland, Ohio, a corporation of Ohio Application August 21, 1951, Serial No. 242,975

12 Claims. (Cl. 90—56)

This invention relates to an attachment for machine tools such as lathes, milling machines, grinders, and the like to accurately index the machines from designated surfaces of the work piece to prevent a build up of tolerances.

Specifically, the invention deals with an index correcting attachment for a milling machine index mechanism, which attachment will cause the index mechanism to creep an amount determined by the position of a reference surface on a work piece mounted for milling in the machine.

The invention will hereinafter be specifically described as embodied in a milling machine index corrector for gauging the blades of an impeller wheel to produce desired blade thicknesses without permitting a build up of thickness tolerances as the wheel is successively indexed in the machine. It should be understood, however, that the principles of this invention are generally applicable for correcting index mechanisms of numerous types of machines, and therefore this invention is not limited to the hereinafter specifically disclosed and described embodiment.

In accordance with this invention, a milling machine work table is constantly urged in one direction of rotation by an electric motor. An index plate rotatable with the table receives an index arm or pawl to limit the rotation of the table. When the index arm engages the index plate, the motor is stalled but still carries a current to produce a torque output which will hold the index plate tightly against the index arm or pawl. This produces a rough indexing of a work piece on the table. A fine creep adjustment of this rough indexing then occurs by shifting the pivot of the index arm or pawl under the influence of a hydraulic system which is controlled from a gauge or feeler that is selectively contacted against a surface of the impeller wheel blade opposite to that surface which is to be milled. This gauge or actuator is shiftable into engagement with the impeller blade under the influence of an air cylinder and is rockably mounted so as to tilt into firm contact with the blade face. The tilted position of the feeler controls flow through the hydraulic system in such a manner that the pivot pin for the index arm or pawl is slightly shifted so as to withdraw the pawl away from the index plate and allow the motor to again take up the slack between the plate and pawl, whereupon a very fine adjustment of the original rough indexing will occur.

It is, therefore, an object of this invention to provide a correcting device for the indexing mechanism of an automatic machine.

Another object of the invention is to provide an index corrector for a milling machine to automatically adjust the rough indexing of the machine for producing an accurate location of the work piece in the machine.

A still further object of the invention is to provide a milling machine work indexing mechanism with a creep mechanism to produce a micrometer adjustment of the position of the work piece for insuring accurate milling.

Another object of the invention is to provide the index arm mechanism of a milling machine with a hydraulic control actuated from a feeler engaging the work piece.

A still further object of the invention is to provide a milling machine having a rotatable work carrier with an adjustable pivot for the indexing arm which controls the rotation of the work carrier to produce a micrometer adjustment of the index mechanism in accordance with the position of a feeler that engages the work piece.

Another object is to provide a method of correcting the index mechanism of a milling machine by shifting the index arm of the machine under the influence of a previously generated surface of the work piece.

Another object of the invention is to provide uniformly thick impeller blades on an impeller wheel by first machining one side of the blades and by gauging the machining of the other side of the blades from the finished side in stepped sequential relation around the circumference of the wheel.

Other and further objects will be apparent to those skilled in the art from the following detailed description of the annexed sheets of drawings which, by way of a preferred embodiment only, illustrate one example of the invention.

On the drawings:

Figure 2 is a fragmentary longitudinal cross sectional view of parts of the machine of Figure 1 taken along the line II—II of Figure 1, and with parts in side elevation.

Figure 3 is a plan view with parts in horizontal cross section and with additional parts diagrammatically shown taken along the line III—III of Figure 2.

Figure 4 is an end elevational view, taken along the line IV—IV of Figure 2.

Figure 5 is a wiring diagram for the control system of this invention.

As shown on the drawings:

Figure 1:
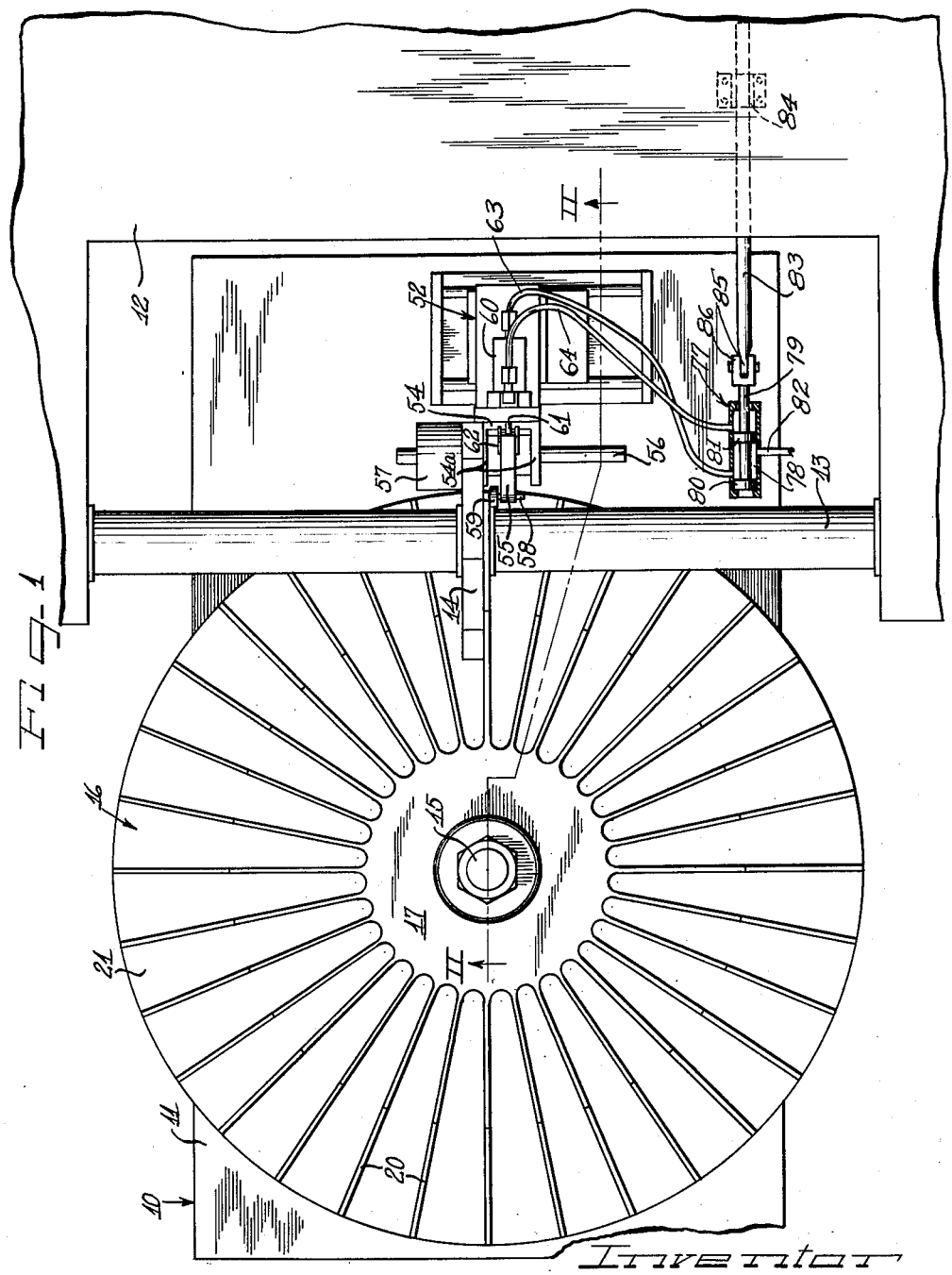
Figure 1 is a fragmentary top plan view of a milling machine equipped with the index corrector of this invention.

In Figure 1, a milling machine 10 is partially illustrated as having a fixed frame or base 11 and a longitudinally shiftable carriage 12 carrying a transverse power shaft 13 above the base 11. A milling cutter 14 is mounted on the shaft 13 and is driven thereby. The base 11 rotatably supports a vertical spindle or post 15. A work piece 16 in the form of a radially bladed impeller wheel has a hub 17 receiving the post 15 therethrough. As shown in Figure 2, a plate or flange 18 on the spindle 15 supports the bottom face of the hub 17 and a nut 19 threaded on the spindle is thrust against the top face of the hub to fixedly clamp the work piece on the spindle. The work piece has radially extending circumferentially spaced blades 20 in upstanding relation on opposite sides of a flat plate-like base 21. The impeller wheel 16 is formed by milling radial gashes into a solid metal disk without cutting completely through the disk, so that a solid hub will be formed with a radial plate-like extension separating the top and bottom sets of blades. The index corrector of this invention is used after one face of each of the blades 20 has been machined and is effective to accurately position the milling tool 14 for machining the opposite face of each blade.

As shown in Figures 2 and 3, the spindle 15 is rotated in a clockwise direction by an electric motor 22 which drives a worm 23 meshed with a worm gear 24 secured on the spindle. The motor 22 has the rotor thereof locked against rotation in a direction other than that for producing the clockwise movement of the worm gear 24 and, in addition, is of a series wound constant torque type that will not burn out when stalled, but will continue to exert a torque on the worm gear. An index wheel or plate 25 is secured on the spindle 15 above the gear 24. This plate 25 has notches around the periphery thereof providing ratchet teeth 26. An index control arm 27 has a pawl or finger 28 on the end thereof adapted to be engaged by the teeth 26. The index arm 27 is pivoted on a pin 29 which is eccentrically carried on the end of a larger diameter pin 30. The pin 30, in turn, is rotatably mounted in the frame or bed 11. The arm 27 is swung about its pivot 29 into and out of the path of the teeth 26 by a hydraulic jack mechanism 31 controlled from the milling machine. This mechanism includes a piston 32 slidable in a cylinder 33 and actuated in opposite directions by fluid fed through and released from control conduits 34. The piston 32 has a piston rod 35 pivotally connected to the arm 27.

The large diameter pin 30 has an arm or lever 36 secured thereon so that shifting of the lever will rotate the pin 30 to change the position of the pin 29, thereby shifting the arm 27 toward and away from the teeth 26.

The lever 36 is pivotally connected to the piston rod 37 of a piston 38 which is slidably mounted in a cylinder 39 as shown in Figure 3. A four-way valve 40 controlled by a solenoid 41 selectively feeds fluid for operating the piston 38 from a supply conduit 42 and back to a return conduit 43. The supply conduit can be conveniently fed from a hydraulic pump driven by the milling machine while the return conduit can discharge into the sump of the machine. The hydraulic fluid under pressure normally passes through the valve 40 and through a restrictor valve 44 having free flow in one direction and restricted reverse flow through an orifice 44a in a flap check gate 44b. As shown, the gate 44b will open to accommodate free flow into a feed line 45 communicating with the under side of the piston 38 in the cylinder 39, but will close so that reverse flow can only occur at a reduced rate through the orifice 44a. The other side of the piston is vented to a tube 46 which connects with tubes 47 and 48. The tube 48 is connected to the return conduit 43 but a valve 49 operated by a solenoid 50 controls flow through the tube 48. The valve 49 is normally closed. The tube 47 is connected to the four-way valve 40 through a check valve 51 which only permits flow out of the valve 40 and prevents back flow from the tube 47 into the valve 40.

Under normal conditions, a hydraulic head of fluid is maintained above the piston 38 and is trapped therein by the check valve 51 and the closed return valve 49. Therefore, the fluid under pressure acting on the under side of the piston is not effective to shift the piston. However, as soon as the solenoid 41 is energized to shift the valve 44 to its dotted line position, the fluid from the supply line 42 will flow freely through the check valve 51 and tubes 47 and 46 into the top of the cylinder 39 above the piston 38 while the fluid beneath the piston will flow back through the tube 47 and restrictor valve 44 to the return line 43. This downward shifting of the piston 38 will move the pivot 29 for carrying the control arm pawl 28 away from the tooth 26, whereupon the motor 22 will immediately rotate the spindle until the tooth is again tightly engaged against the pawl. The restrictor valve 44 determines the rate at which the exhaust fluid escapes from the cylinder and thereby controls the rate of speed in which the index arm falls away from the tooth. When the correct index position is reached, the solenoid 41 is deenergized and the valve 40 returns to its solid line position, thereby again locking the piston in the cylinder in the position which it assumes after the correction has been made. When it is desired to reset the pin 29 to its original position, the solenoid 50 is energized to open the valve 49 whereupon the extra fluid on top of the piston 38 will be released and the fluid under pressure from the tube 45 will raise the piston 38.

The solenoid 41 is automatically controlled by a gauging mechanism best shown in Figures 1, 2, and 4. This mechanism includes a bearing housing 52 mounted on the frame or base 11 and rotatably supporting a shaft 53 carrying a yoke 54. A finger 55 is positioned between the ears 54a of the yoke and is pivotally mounted on a pin 56 carried by the ears. As shown in Figure 1, the pin 56 extends laterally beyond the ears and a weight 57 is mounted on one end of the pin so as to bias the yoke 54 for rotation in a direction that will move the finger 55 toward the face of the impeller blade 20 which opposes that face that is to be engaged by the cutting tool 14.

The upper end of the finger 55 projects forwardly and carries a transverse pin 58 on one end of which is mounted a button adapted to have its end face engage the blade face and held thereagainst by the weight 57.

The finger 55 is shifted about the pin 56 by means of a pneumatic jack 60 carried on the top end of the yoke member 54 and having a piston rod 61 pivotally connected through a link 62 with the upper end of the finger. When air is admitted to the jack cylinder through a tube 63 and released through a tube 64, the piston will be forced in a direction for moving the piston rod outwardly of the cylinder thereupon shifting the upper end of the finger toward the work piece to move the button 59 into the path of the adjacent blade 20. When the air flow is reversed so that air is introduced through the tube 64 and removed through the tube 63, the finger will be pulled back out of the path of the work piece.

An adjustable stop 65 is carried by the lower end of the yoke member 54 for engaging the lower end of the finger to limit the extent of forward movement of the upper end of the finger.

An electrical limit switch 66 is mounted on the yoke 54 above the stop 65 to be engaged by the finger 55 for closing a circuit whenever the finger is moved into its operative position and for opening a circuit whenever the finger is withdrawn away from the switch and stop.

An arm 67 is secured on the shaft 53 in the housing 52 and depends from the shaft to carry a pin 68 between two electric limit switches 69 and 70 as best shown in Figure 4. When the weight 57 is free to tilt the yoke 54, the arm 67 will be swung like a pendulum to move the pin 68 against the limit switch 69. When the button 59 on the finger 55 is moved by the blade 20, the yoke 54 will be tilted in the opposite direction to rock the shaft 53 for swinging the arm 67 so that the pin 68 will engage the other limit switch 70.

As shown in the wiring diagram of Figure 5, wherein 71 and 72 are the power lines, closing of the limit switch 66 by the finger 55 will feed current to the switches 69 and 70. When the switch 70 is closed, a light 73 will be lit to indicate that an over correction has been made. When limit switch 69 is closed, the solenoid 41 for the four-way valve 40 will be energized, thereby shifting the valve to the dotted line position shown in Figure 3 and permitting the flow of hydraulic fluid for shifting the piston 38 downwardly to rock the pivot for the control arm 27 to move the pawl end 28 thereof away from the tooth 26, whereupon a creep will take place to correct the index. At the same time a signal light 74 will be lit to show that correction is taking place. An additional solenoid 75 is preferably provided in this same circuit to control a valve (not shown) which will stop movement of the carriage 12, so that the cutter 14 will not be moved into position until the correction has been completed. When the correction has been completed, the pin 68 will be in a neutral position and both switches 69 and 70 will be opened. The cutting tool 14 is thereupon advanced over the surface of the blade opposite the surface engaged by the button 59 and the milling operation is completed on this face of the blade.

When the cutter carriage retracts after completing the cut, an air valve controlled by movement of the cutter carriage reverses the flow of air to the cylinder 60 so that the piston rod 61 will be drawn into the cylinder and the finger will be retracted out of the path of the work piece. The limit switch 66 will thereupon be opened and no signals can be sent from the button 59 to the index creep control. The solenoid 50 is thereupon actuated by closing a switch 76, as shown in Figure 5, whereupon the normally closed valve 49 of Figure 3 will be opened and the piston 36 is shifted back to its starting position for moving the eccentric pin 29 to its initial position. During this retraction of the carriage, the control arm 27 is retracted away from the tooth 26 so that the motor 22 can index the spindle and work piece.

As shown in Figure 1, an air valve 77 controls flow to and from the tubes 63 and 64 to operate the jack 60 in both directions. This air valve has a housing 78 slidably mounting a plunger rod 79 with spaced heads 80 and 81 defining a sealed connecting chamber therebetween adapted to place an air inlet 82 of the housing selectively into communication with the tubes 63 and 64 leading to the jack 60. When air is fed to one tube, it is exhausted from the other tube, since a plunger head will ride past the tube port as shown. The rod 79 is actuated by a push shaft 83 carried in a friction bushing 84 on the carriage 12. A tongue 85 on the end of the push shaft 83 projects into and engages a socket head 86 on the plunger rod 79 to propel the rod as the carriage 12 moves toward the work piece and to repel the rod as the carriage retracts, thereby actuating the jack to move the finger 55 into and out of operative position. Continued movement of the carriage 12 beyond the limits of movement of the push shaft 83 will result in slippage of the push shaft in the friction bushing 84. This arrangement automatically controls the position of the finger 55.

If desired, the limit switch 70 can be placed in a circuit to stop movement of the cutter carriage in the event an overcorrection takes place. To accomplish this, it is only necessary to place a solenoid operated valve in the same circuit with the light 73 and to utilize this valve for controlling movement of the carriage.

From the above descriptions, it will be understood that one face of each blade 20 of the impeller wheel 16 is initially finished. Each finished face is sequentially engaged by the control button 59 on the finger 55. The main indexing mechanism consisting of the index plate 25 and the arm 27 is actuated by the motor 22 and the hydraulic jack 31 so that an underindexing of the wheel 16 will occur by this mechanism alone. The underindexing is then immediately corrected by the creep correction assembly of this invention which shifts the pivot pin for the control arm 27 to move the arm away from the tooth of the index plate engaged thereby a distance which is just sufficient to permit an added indexing that will accurately position the opposite face of the blade to be milled for action by the milling cutter 14. Since each blade is gauged from its opposite face, the blade thickness is accurately controlled, and heretofore encountered tolerance build-ups, such as occur in the use of the indexing device without the creep corrector, are avoided. The gauging mechanism includes an automatic shut-off switch which will stop all signals and correcting operations until the gauging button is in the path of the work piece.

It will be understood that modifications and variations may be effected without departing from the scope of the novel concepts of the present invention.

I claim as my invention:

1. Indexing mechanism for a machine tool which comprises a rotatable work support having a work piece thereon, means exerting a rotating torque on said work support, an index plate rotatable with said support and having stop means thereon, a pivotally mounted control arm engageable with said stop means to stop rotation of the work support at an initial position, means for shifting said control arm into and out of the path of said stop means, means for shifting the pivot of said control arm to move the arm toward and away from said index plate to allow the torque to change the position in which the plate, and hence the work piece is finally positioned, and a feeler selectively engageable with a reference portion on a work piece on the work support for controlling said means for shifting the pivot whereby the position of said index plate is finally adjusted in accordance with the position of said reference portion on the work piece.

2. An index corrector for a machine tool having a control arm selectively engageable with an index plate on a work support and providing a positioning stop therefor which comprises, a feeler on said machine, means for selectively positioning said feeler in engagement with a reference surface on a work piece carried by the work support, after an initial indexing thereof and means energized by said feeler in response to deflection thereof by said reference surface when the initial indexed position of said surface is incorrect for shifting the control arm to permit creeping movement of the index plate and work support under the influence of a drive torque to adjust the indexing of the work piece.

3. A correction device for a ratchet and pawl type indexing mechanism of a machine tool which comprises a gauge member adapted to be shifted by a reference surface of a work piece mounted in said machine, electrical mechanisms controlled by said gauge, hydraulic mechanisms controlled by said electrical mechanisms including a fluid motor for shifting the mounting of said pawl to permit additional movement of the ratchet under the influence of a constantly applied rotational torque for refining the index control of the work piece effected thereby.

4. An index corrector for a machine tool of the type having a rotatable work support, means for applying torque to said support and ratchet and pawl means for indexing said support, a gauge on said machine, means for shifting said gauge into and out of the path of a work piece on said work support to engage a finished reference surface on said work piece, a tiltable support for said gauge, a switch adapted to be closed by tilting of said support, a solenoid energized by said switch, a fluid flow control valve actuated by said solenoid, a hydraulic jack controlled by said valve, and a control arm connecting said jack with said pawl to shift the pivot of said pawl away from the tooth of the ratchet engaged thereby for permitting additional rotation of the work support by said torque applying means to thus gauge the indexing thereof directly from the surface on the work piece engaged by the gauge.

5. A device for correcting the index mechanism of a machine tool under the influence of a generated reference surface on the work piece being acted upon by said machine tool which comprises a rock shaft, a finger pivoted on said shaft, means for shifting said finger into and out of the path of the work piece, a switch closed by said finger when the finger is shifted into the path of the work piece whereby means are actuated to indicate operation of the correcting mechanism, a second switch controlled by the rock shaft to be closed when the position of the reference surface of the work piece is correct and thereby permits tilting of the finger, and means energized by said second switch for shifting the index mechanism to move the work piece until the finger is in an untilted position.

6. In a machine tool having a rotatable work support constantly urged in one direction and a control arm selectively locking the work support in an indexed position against movement in said one direction, the improvement of a correction device for said control arm including an eccentric pivot supporting said arm, a fluid motor for shifting said pivot to permit slight additional movement of the work support under said constant urging, and a gauge shiftable against a reference surface on a work piece on said work support to control the fluid motor.

7. A device for correcting the ratchet and pawl type index mechanism of a machine tool which comprises an eccentric pivot for the pawl, a hydraulic jack adapted to shift said pivot to move the pawl toward and away from the ratchet for changing the indexed position of the tool, a gauge finger selectively movable into and out of the path of a work piece on the work support for engaging a finished surface of the work piece, and a limit switch actuated by said gauge to energize the hydraulic jack for shifting the pivot whenever the gauge is tilted as a result of an incorrect initial indexed position of the work.

8. An index corrector for the index mechanism of a machine tool which comprises a shaft rockably mounted on said machine tool about a first axis, a gauge pivotally mounted on said shaft about a second axis, means for moving said gauge about its pivot into and out of the path of a reference surface on a work piece in the machine, a contact arm on said shaft, opposed switches actuated by said contact arm, and means controlled by said switches for shifting the index mechanism and for signaling the shifting of said mechanism when said gauge intercepts the surface at an incorrect angle thereby indicating an incorrect index position.

9. In a milling machine having a rotatable work support and a reciprocal tool carriage for a rotatable milling tool, index mechanism for indexing a work piece on said support relative to said tool and in accord with a previously machined surface on the work piece, and correction mechanism for said index mechanism including a feeler tiltable on said machine against said previously machined reference surface and means controlled by said feeler for regulating said index mechanism to cause additional rotation of the work support until the feeler is tilted to a predetermined position by movement of the rotating work piece toward the tilt axis of said feeler until the work piece is in its proper indexed position relative thereto as determined by the previously machined surface.

10. A correction device for a ratchet and pawl index mechanism utilized with a partially machined work piece which comprises, a shiftable pivot for the pawl, means for shifting the pivot, and a feeler engageable with a previously machined surface on said work piece and interconnected with said means for controlling said means to vary the relationship between said ratchet and the fixed base of the mechanism and thereby change the position of the work piece relative to said fixed base and a tool mounted thereon for cooperation with said work piece.

11. A work positioner for a milling machine having a reciprocal tool carriage and a rotatable work piece holder, which comprises a shiftable feeler on the machine, first means for moving the feeler into and out of the path of a workpiece on the holder, second means for moving the feeler into contact with a previously machined surface on said work piece, mechanism controlled by said feeler for rotating the holder, and mechanism controlled by the carriage for actuating said first means.

12. An index corrector for a machine tool of the type having a work support mounted for rotation on a base, means for applying a constant rotary torque to said support, ratchet and pawl means secured to said work support for indexing said support and maintaining said support against rotation, a gauge mounted on said base, means for shifting said gauge into and out of the path of rotation of a work piece mounted on said work support, a tiltable support for said gauge, means for tilting said gauge toward said work piece, a switch adapted to be closed by an excess tilting of said gauge caused by the work piece being indexed by said pawl and ratchet to an incorrect position, a solenoid energized by said switch, a fluid control valve actuated by said solenoid, an hydraulic jack controlled by said control valve and a control arm connecting said jack with said pawl to shift the pivot of said pawl away from the engaged tooth of the ratchet for permitting additional rotation of the work support by said constantly applied torque to a point in which the work piece has moved sufficiently to cause said gauge to assume a non-tilted position to thereby open said switch, whereby the indexing of said work piece is based on a finished surface thereof rather than merely the position of the work support.

HENRY C. STIEGLITZ.

References Cited in the file of this patent

UNITED STATES PATENTS

| Number | Name | Date |
| --- | --- | --- |
| 1,585,851 | Glocker | May 25, 1926 |
| 2,187,794 | Schmidt | Jan. 23, 1940 |
| 2,291,382 | Duglin | July 28, 1942 |
| 2,388,173 | Miller | Oct. 30, 1945 |
| 2,390,994 | DeVlieg | Dec. 18, 1945 |
| 2,524,091 | Von Zimmerman | Oct. 3, 1950 |
| 2,574,110 | Kopec | Nov. 6, 1951 |
| 2,585,329 | Johnson | Feb. 12, 1952 |